(12) United States Patent
Park et al.

(10) Patent No.: US 9,520,611 B2
(45) Date of Patent: Dec. 13, 2016

(54) REDOX FLOW BATTERY

(71) Applicant: SAMSUNG ELECTRONICS CO., LTD., Suwon-si, Gyeonggi-do (KR)

(72) Inventors: Joung-won Park, Yongin-si (KR); Duk-jin Oh, Seoul (KR); Doo-yeon Lee, Yongin-si (KR); Myung-jin Lee, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 246 days.

(21) Appl. No.: 14/077,471

(22) Filed: Nov. 12, 2013

(65) Prior Publication Data
US 2014/0193687 A1    Jul. 10, 2014

(30) Foreign Application Priority Data
Jan. 8, 2013    (KR) .................. 10-2013-0002222

(51) Int. Cl.
*H01M 8/18*    (2006.01)

(52) U.S. Cl.
CPC ............ *H01M 8/188* (2013.01); *Y02E 60/528* (2013.01)

(58) Field of Classification Search
None
See application file for complete search history.

(56) References Cited

U.S. PATENT DOCUMENTS

| | | |
|---|---|---|
| 2003/0120088 A1 | 6/2003 | Senda et al. |
| 2008/0249308 A1 | 10/2008 | Baratta et al. |
| 2010/0145087 A1 | 6/2010 | Mikhailine et al. |
| 2011/0189549 A1* | 8/2011 | Sun .................. H01M 6/16 429/338 |
| 2011/0195283 A1 | 8/2011 | Sun et al. |
| 2012/0107660 A1 | 5/2012 | Li et al. |
| 2012/0115069 A1 | 5/2012 | Noack et al. |
| 2014/0030572 A1* | 1/2014 | Esswein ............ H01M 8/188 429/107 |

OTHER PUBLICATIONS

Herrmann et al. (Angew. Chem. Inl. Ed. Engl. 1997, 36, 2162-2187).*

* cited by examiner

*Primary Examiner* — Carlos Barcena
*Assistant Examiner* — Wojciech Haske
(74) *Attorney, Agent, or Firm* — Cantor Colburn LLP

(57) ABSTRACT

A redox flow battery including a cathode cell having a cathode and a catholyte solution; an anode cell having an anode and an anolyte solution; and an ion exchange membrane disposed between the cathode cell and the anode cell, wherein the catholyte solution and the anolyte solution each include an electrolyte, wherein the electrolyte includes a plurality of metal-ligand coordination compounds, wherein at least one of the metal-ligand coordination compounds includes two or more different ligands, and wherein a dipole moment of the metal-ligand coordination compound is greater than 0.

6 Claims, 4 Drawing Sheets

REDOX FLOW BATTERY

CROSS-REFERENCE TO RELATED APPLICATIONS

This application claims priority to and the benefit of Korean Patent Application No. 10-2013-0002222, filed on Jan. 8, 2013, and all the benefits accruing therefrom under 35 U.S.C. §119, the content of which is incorporated herein in its entirety by reference.

BACKGROUND

1. Field

The present disclosure relates to redox flow batteries, and more particularly, to redox flow batteries with high energy density and high charge and discharge efficiency.

2. Description of the Related Art

Typical secondary batteries convert electric energy into chemical energy during charging, and convert chemical energy into electric energy during discharging.

Likewise, redox flow batteries ("RFB") convert chemical energy into electrical energy or vice versa during charging and discharging. However, unlike typical secondary batteries, an electrode material of an RFB, which stores energy, exists in a liquid state, not a solid state. Thus, in a redox flow battery, the electrode active material is stored in a tank, and a voltage of the battery may be increased by stacking unit cells.

In detail, a catholyte and an anolyte function as an electrode active material, and typically, a transition metal oxide dissolved in a solvent, so the electrode active material exists in a liquid state. That is, a catholyte and an anolyte are stored in a tank as a mixture of reduced and oxidized electrolytes.

Also, like a fuel cell, a cell generating electric energy, has a structure of carbon electrode/membrane/carbon electrode. In such a cell, the catholyte and the anolyte supplied by a pump each undergo an oxidation or reduction reaction on a surface of a corresponding carbon electrode, generating an electromotive force corresponding to Gibbs free energy. The carbon electrodes do not directly participate in a reaction and only aid the oxidation and reduction of an active material. The membrane does not directly participate in a reaction, however, it quickly delivers ions, thus playing a role of a charge carrier between the catholyte and the anolyte, prevents a direct contact between a cathode and an anode, and suppresses the crossover of active ions dissolved in the catholyte and the anolyte.

In the case of redox flow batteries, including an organometallic coordination compound as an electrolyte, a redox couple with high voltage or a redox couple with high solubility may be used to achieve high energy density.

However, a conventional redox flow battery using an aqueous solvent has a disadvantage of low energy density caused by a low driving voltage as an operation potential is limited to the water decomposition potential. Accordingly, there is a continuous demand for a redox flow battery having a high energy density and excellent charge and discharge efficiency.

SUMMARY

Provided are redox flow batteries that have high energy density and excellent charge and discharge efficiency due to the inclusion of a redox couple with high solubility as an electrolyte.

Additional aspects will be set forth in part in the description which follows and, in part, will be apparent from the description, or may be learned by practice of the presented embodiments.

According to an aspect, a redox flow battery includes:
a cathode cell including
a cathode and
a catholyte solution;
an anode cell including
an anode and
an anolyte solution; and
an ion exchange membrane disposed between the cathode cell and the anode cell,
wherein the catholyte solution and the anolyte solution each includes an electrolyte,
wherein the electrolyte includes a plurality of metal-ligand coordination compounds, and
wherein at least one of the metal-ligand coordination compounds includes two or more different ligands, and
wherein a dipole moment of the metal-ligand coordination compound is greater than 0.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
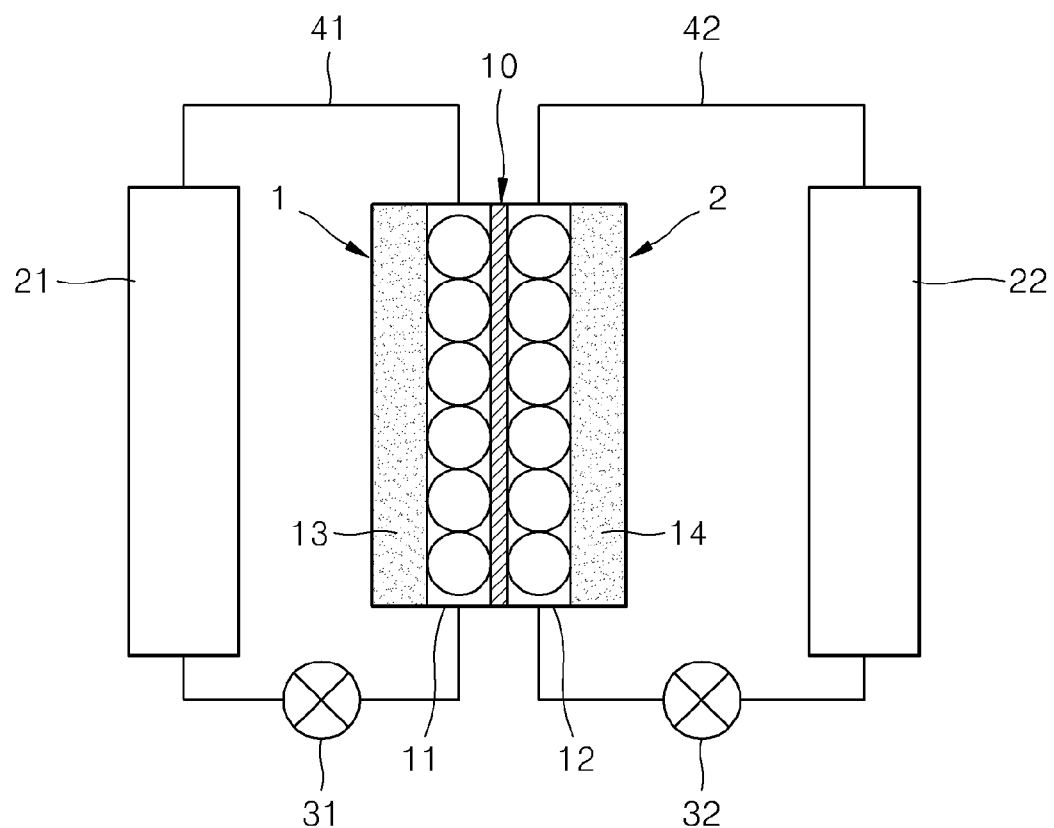
FIG. 1 is a schematic view of a redox flow battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Heteroaliphatic" as used herein refers to a saturated or unsaturated, cyclic, linear, or branched hydrocarbon group or compound that includes as least one heteroatom (e.g., 1, 2, or 3) in the backbone. Heteroaliphatic ligands may include, for example, groups having from 1 to 21 carbon atoms, from 1 to 12 carbon atoms, or from 1 to 6 carbon atoms. The heteroatom(s) are generally independently selected from nitrogen (N), oxygen (O), P (phosphorus), and sulfur (S).

"Heteroaromatic" as used herein refers to a monovalent carbocycle that includes one or more aromatic rings, in which at least one ring member (e.g., 1, 2, or 3 ring members) that is a heteroatom. In a C3 to C30 heteroaromatic ligand, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

"Alkyl" as used herein refers to a monovalent group derived from a straight or branched chain saturated aliphatic hydrocarbon. Alkyl groups may include, for example, groups having from 1 to 6 carbon atoms (C1-C6 alkyl).

At least one hydrogen atom of the alkyl group may be substituted with a halogen atom, a C1-C6 alkyl group, a C1-C6 alkyl group substituted with a halogen atom (for example, —$CCF_3$, —$CHCF_2$, —$CH_2F$, —$CCl_3$, and the like), a C1-C6 alkoxy group, a hydroxyl group (—OH), a nitro group (—$NO_2$), a cyano group (—CN), an amino group (—NRR', wherein R and R' are independently hydrogen or a C1-C6 alkyl group), an amido group (—C(=O)NRR', wherein R and R' are independently hydrogen or a C1-C6 alkyl group), a hydrazine group (—NHNRR', wherein R and R' are independently hydrogen or a C1-C6 alkyl group), a hydrazone group (—CR=NHNR'R", wherein R, R' and R" are independently hydrogen or a C1-C6 alkyl group), an azido group (—$N_3$), an amidino group (—C(=NH)NRR' wherein R and R' are independently hydrogen or a C1-C6 alkyl group), a carboxyl group (—$CO_2H$) or a salt thereof, a sulfonic acid group (—$SO_3H$) or a salt thereof, or a phosphoric acid group (—P(=O)(OH)$_2$) or a salt thereof.

"Alkoxy" as used herein refers to an "alkyl-O", wherein "alkyl" is the same as defined above. Alkoxy groups may include, for example, groups having from 1 to 6 carbon atoms (C1-C6 alkoxy).

"Heterocyclic" as used herein refers to a five- to ten-membered carbocyclic group including a heteroatom such as N, S, P, or O, and having the specified number of carbon atoms.

Hereinafter, redox flow batteries according to one or more embodiment are described in detail.

FIG. 1 is a schematic view of a redox flow battery according to an embodiment.

Referring to FIG. 1, the redox flow battery is divided into a cathode cell 1 and an anode cell 2 by an ion exchange membrane 10. The cathode cell 1 and the anode cell 2 respectively include a cathode 13 and an anode 14. The cathode cell 1 is connected to a cathode tank 21 from which a catholyte 11 is supplied through a pipe 41 and to which the catholyte 11 is delivered through the pipe 41. Likewise, the anode cell 2 is connected to an anode tank 22 from which an anolyte 12 is supplied through a pipe 42 and to which the anolyte 12 is delivered through the pipe 42. An electrolytic solution is circulated by pumps 31 and 32, and charging and discharging occurs at the cathode 13 and the anode 14 due to a valence change of ions.

The ion exchange membrane 10 prevents mixing of active material ions of the catholyte 11 and the anolyte 12 and allows only a charge carrier ion of a supporting electrolyte to pass therethrough.

A redox flow battery according to an embodiment includes:
a cathode cell including
  a cathode and
  a catholyte solution;
an anode cell including
  an anode and
  an anolyte solution; and
an ion exchange membrane disposed between the cathode cell and the anode cell,
wherein the catholyte solution and the anolyte solution each includes an electrolyte,
wherein the electrolyte includes a plurality of metal-ligand coordination compounds,
wherein at least one of the metal-ligand coordination compounds includes two or more different ligands, and
wherein a dipole moment of the metal-ligand coordination compound is greater than 0.

A redox flow battery is discharged by connecting it to an external circuit having an electric load to make a current to flow out, and is charged by connecting it to an external power source to make a current flow in.

Typically, a catholyte is charged when a redox couple is oxidized to the higher one of its two oxidation states, and is discharged when the redox couple is reduced to the lower one of the oxidation states. On the other hand, an anolyte is charged when a redox couple is reduced to the lower one of its two oxidation states, and is discharged when the redox couple is oxidized to the higher one of the oxidation states:

Cathode $C^n \rightarrow C^{n+y} + ye^-$ (charging)

$C^{n+y} + ye^- \rightarrow C^n$ (discharging)

(C: catholyte)

Anode $A^{n+x} + xe^- \rightarrow A^n$ (charging)

$A^n \rightarrow A^{n+x} + xe^-$ (discharging)

(A: anolyte)

An operating potential of a typical redox flow battery using an aqueous solvent is limited to a water decomposition potential region. Accordingly, an energy density of the redox flow battery is low. Such a low energy density may be increased by using a non-aqueous solvent.

In an embodiment, each of a catholyte and an anolyte includes an electrolyte including a metal-ligand coordination compound, and at least one of the metal-ligand coordination compounds includes two or more different ligands, and in this case, a dipole moment of the metal-ligand coordination compound is greater than 0. Accordingly, a solubility of the electrolyte in a non-aqueous solvent increases, thereby enabling the manufacturing of a redox flow battery with charging and discharging efficiency and energy density. For example, in the case of a metal-ligand coordination compound, when the number of ligands is 2, the ligands may include two different ligands; when the number of ligands is 3, the ligands may include one ligand and two other ligands, which are identical to each other, or three different ligands. In addition, the wording that the dipole moment of the metal-ligand coordination compound is greater than 0 means that when the vectors representing dipole moments in different directions in a metal-ligand coordination compound are added up, the dipole moment sum is greater than 0 and thus, the metal-ligand coordination compound has an asymmetric structure and polarity greater than 0. Due to the polarity of the metal-ligand coordination compound, a solubility of the electrolyte in a polar non-aqueous solvent increases.

A center metal in the metal-ligand coordination compound may be at least one selected from Ni, Co, Fe, Ru, Zn, Mn, Y, Zr, Ti, Cr, Mg, Ce, Cu, Pb, and V.

A ligand in the metal-ligand coordination compound may be an aromatic ligand or an aliphatic ligand; however, the nature of the ligand is not limited thereto, and the ligand may be a nitrogen-containing heteroaromatic ligand or a nitrogen-containing heteroaliphatic ligand. In detail, the ligand may be at least one selected from a substituted or unsubstituted dipyridyl, a substituted or unsubstituted terpyridyl, a substituted or unsubstituted phenanthroline, a substituted or unsubstituted ethylenediamine, a substituted or unsubstituted propylenediamine, and a substituted or unsubstituted N-heterocyclic carbene ("NHC").

The substituted and unsubstituted NHC may be 2,6-bis (methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, or 1-ethyl-3-methylimidazole.

The substituted dipyridyl, the substituted terpyridyl, the substituted phenanthroline, the substituted ethylenediamine, the substituted propylenediamine, and the substituted NHC may have at least one of a C1 to C6 alkyl group, a halogen atom, a C5 to C8 alkylphenyl group, and a nitro group as a substituent.

The metal-ligand coordination compound may undergo a reversible oxidation and reduction reaction.

Examples of a metal-ligand coordination compound according to an embodiment, including two or more different ligands included as an electrolyte in a catholyte and/or an anolyte, and in this case, having a dipole moment sum of greater than 0 are as follows:

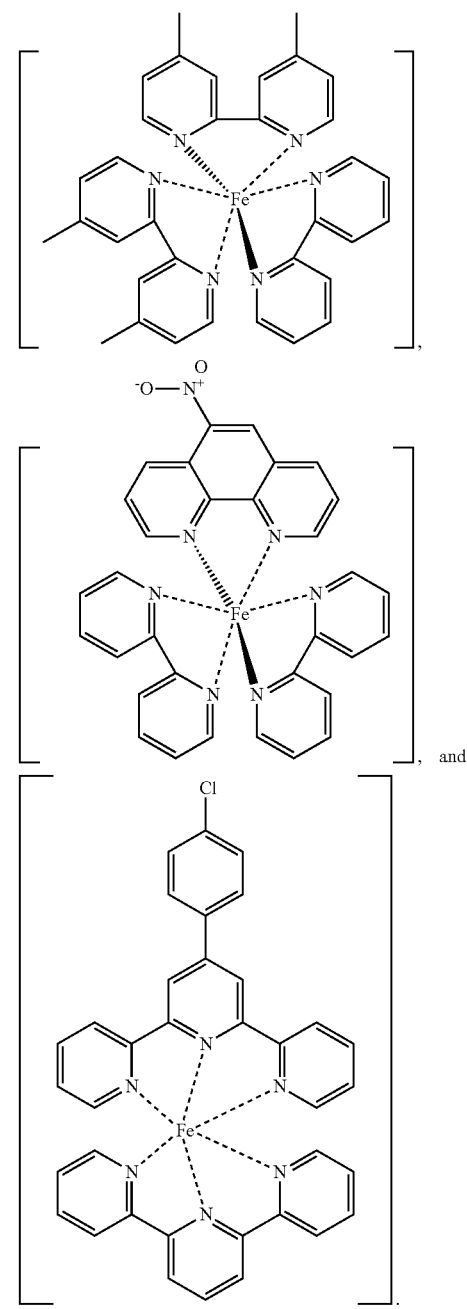

When one of the metal-ligand coordination compounds included in the catholyte and an anolyte includes two or more different ligands, and in this case, a dipole moment sum is greater than 0, the other one may be one of the following compounds:
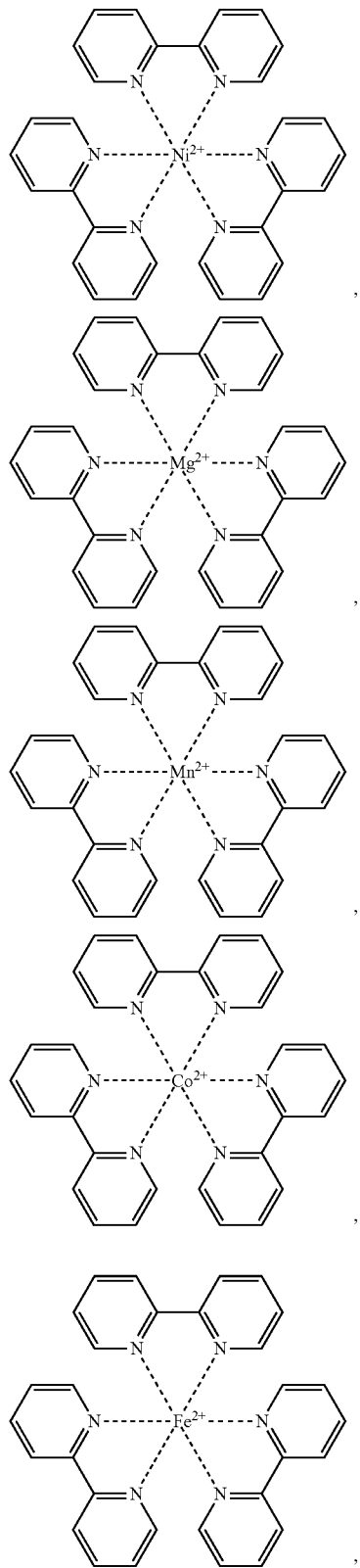
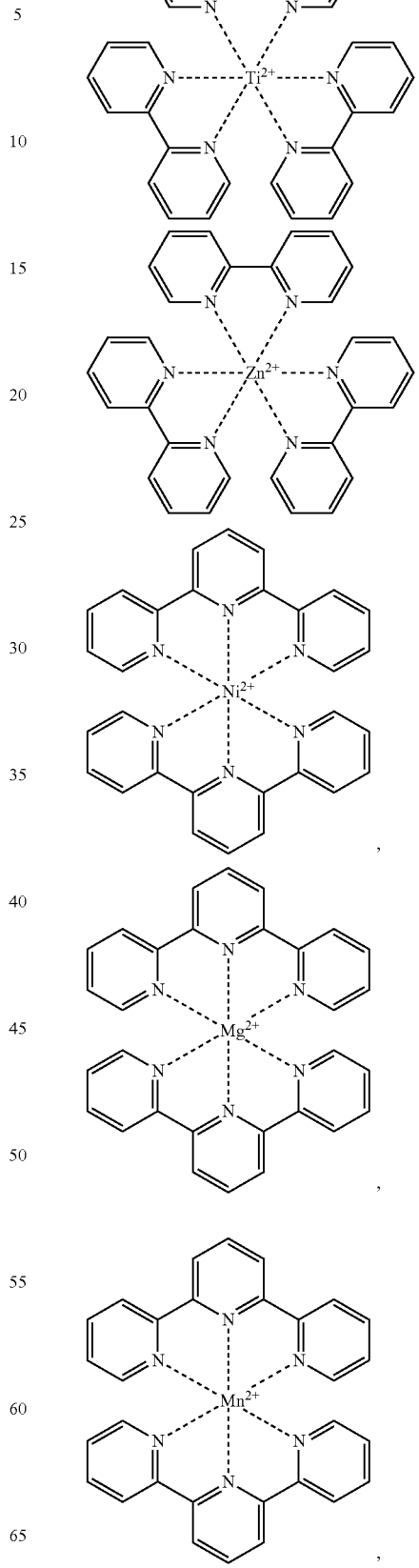

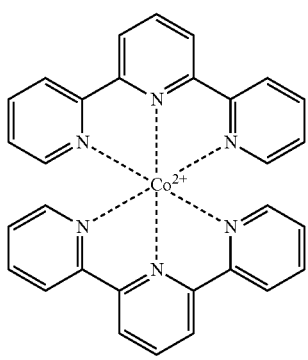,
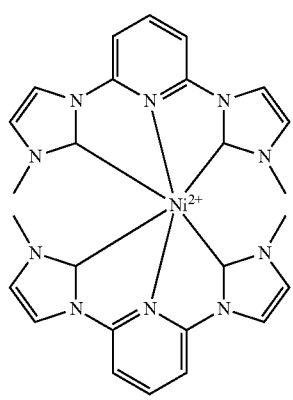,
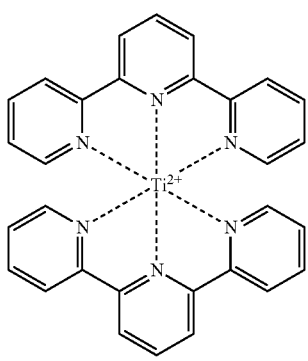,
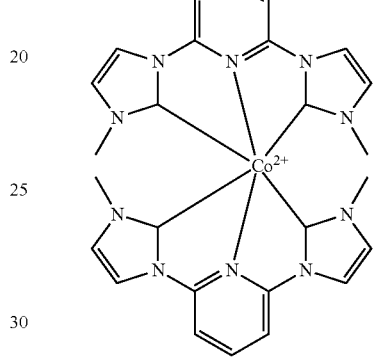,
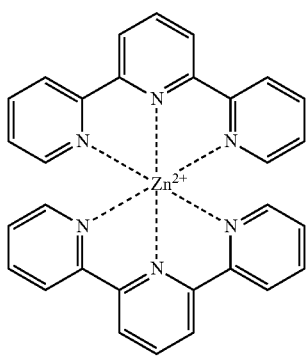,
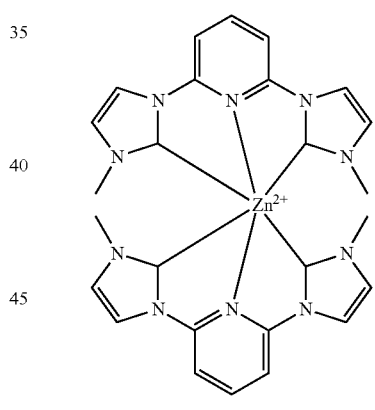,
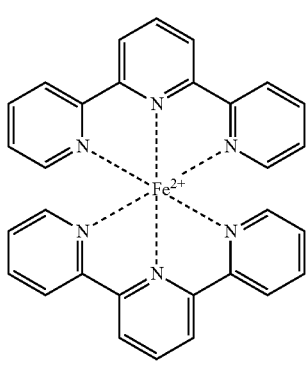,
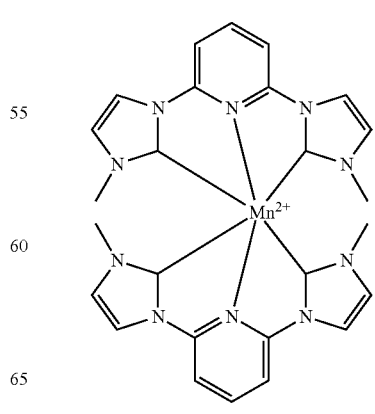,

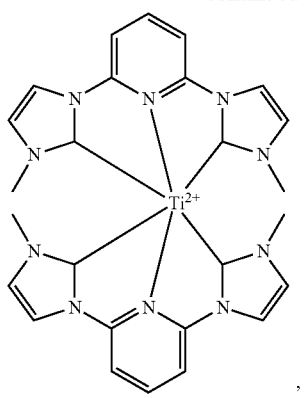
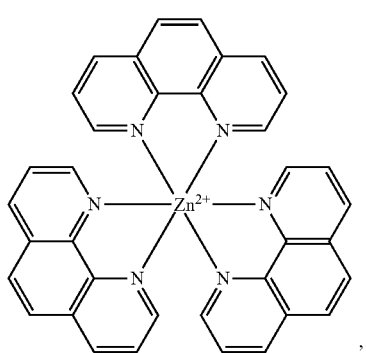
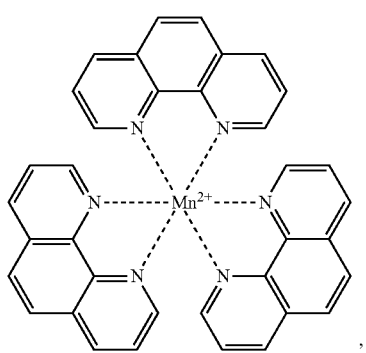
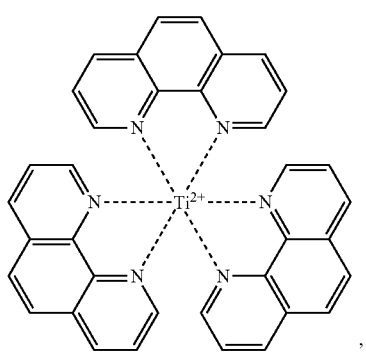
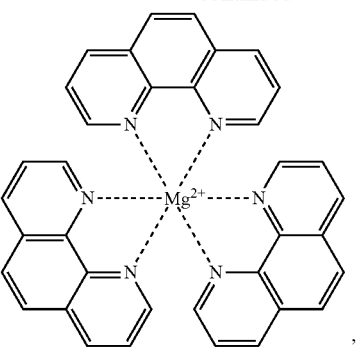
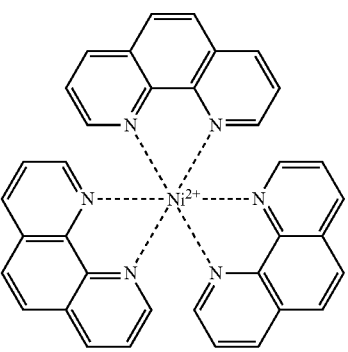
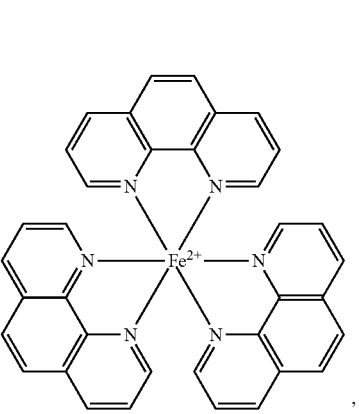
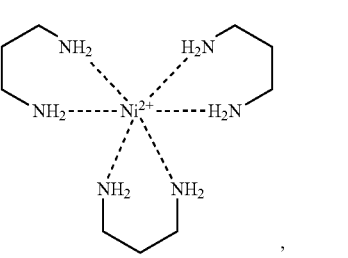
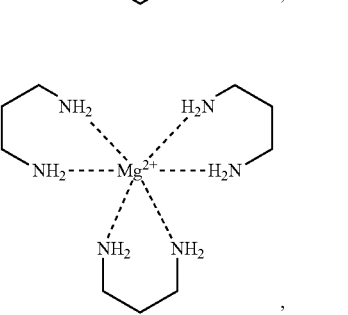

-continued

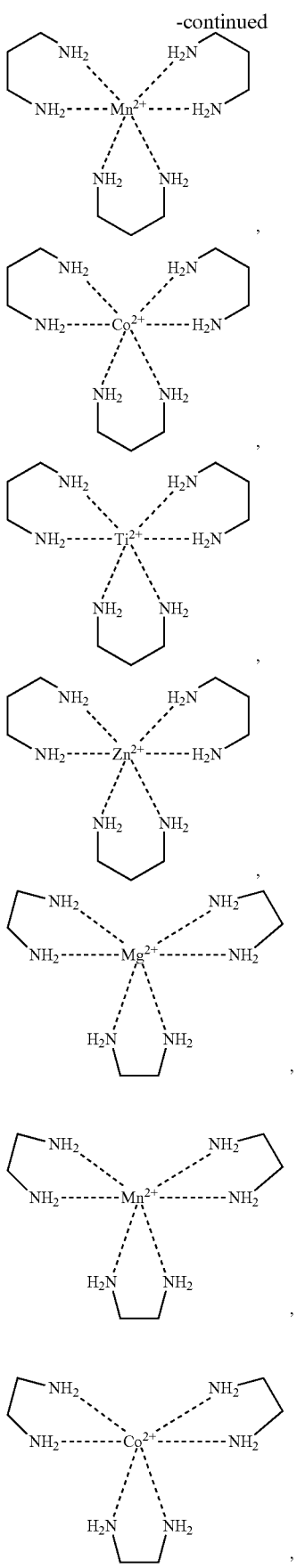

,

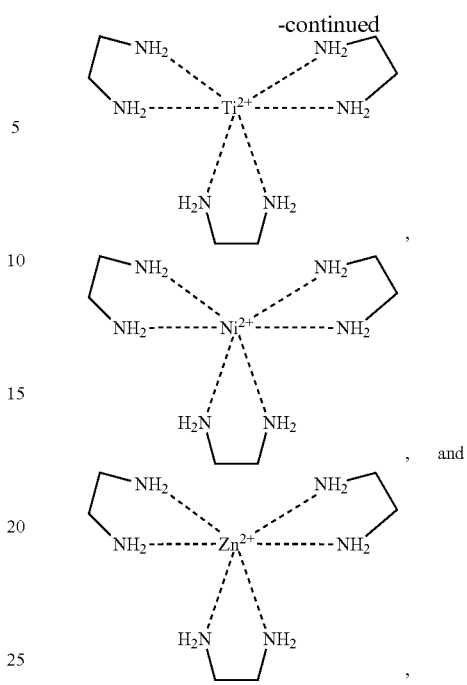

, and

Each of the catholyte and the anolyte may further include, as a counter anion of the metal-ligand coordination compound, $BF_4^-$, $PF_6^-$, $CF_3SO_3^-$, or $(CF_3SO_2)_2N^-$.

Each of the catholyte and the anolyte may further include a non-aqueous solvent, such as, dimethyl acetamide, diethyl carbonate, dimethyl carbonate, acetonitrile, γ-butyrolactone ("GBL"), propylene carbonate ("PC"), ethylene carbonate ("EC"), N-methyl-2-pyrrolidone ("NMP"), fluoroethylene carbonate, or N,N-dimethylacetamide.

The redox flow battery may further include a catholyte tank and an anolyte tank wherein the catholyte tank and the anolyte tank is each respectively in fluid communicated with the cathode cell and anode cell.

As the ion exchange membrane, an ion exchange membrane that is used in a typical redox flow battery may be used without any limitation. As a cation exchange membrane, a cation exchange membrane obtained by sulfonation a styrene-divinylbenzene copolymer, a cation exchange membrane obtained by introducing a sulfonic acid group to a copolymer of tetrafluoroethylene and perfluorosulfonylethoxyvinylether that is a base, a cation exchange membrane formed of a copolymer of tetrafluoroethylene and perfluoro vinyl ether having a carboxyl group as a side chain, or a cation exchange membrane obtained by introducing a sulfonic acid group to an aromatic polysulfone copolymer that is a base may be used.

When a typical cation exchange membrane is used, a salt of a cation, such as $Na^+$, $Li^+$, or $H^+$, is used as a source of a charge carrier. However, a solubility of such a salt in a non-aqueous solvent decreases, so when a small amount of water is added to the organic solvent to increase the solubility of the salt, the ligand becomes unstable, and thus, may result in an incomplete reversibility of the oxidation/reduction reaction. In contrast, when an anion exchange membrane is used, a salt with high aqueous solubility even in a non-aqueous solvent can be utilized. Accordingly, when water is completely removed, decomposition of the ligand is prevented, and an oxidation and reduction reaction of a metal-ligand coordination compound becomes completely reversible, thereby improving cyclic characteristics improve and voltage characteristics of the battery.

The use of the anion exchange membrane is advantageous in that it prevents mixing of the catholyte and the anolyte, allows a counter anion of the metal-ligand coordination compound to be used as a charge carrier, ensures a sufficient concentration of a charge carrier even with a small amount of a supporting electrolyte, and suppresses a flow of a cationic active material to achieve charging and discharging efficiency and voltage efficiency of the battery.

The anion exchange membrane may be an anion exchange membrane obtained by introducing a chloromethyl group to a styrene-divinylbenzene copolymer that is a base, followed by amination, an anion exchange membrane obtained by a formation of a quaternary pyridinium salt of a vinylpyridine-divinylbenzene copolymer, or an anion exchange membrane obtained by introducing a chloromethyl group to an aromatic polysulfone copolymer that is a base, followed by amination.

Available anion exchange membranes are NEOSEPTA-AMEX, NEOSEPTA-AHA, NEOSEPTA-ACS, which are manufactured by ASTOM; Cybron ionan MA3475, which is manufactured by LANXESS; FAS, FAB, FAN, FAA, FAD, which are manufactured by FuMa-atech; and PC 100D, PC 200D, PC-SA which are manufactured by Polymerchemie Altmeier ("PCA").

Each of the catholyte and the anolyte may further include a supporting electrolyte, which helps to achieve a charge balance between the catholyte and the anolyte without a direct participation in a reaction.

The supporting electrolyte may be at least one selected from $LiBF_4$, $LiPF_6$, $LiClO_4$, $LiCF_3SO_3$, $Li(CF_3SO_2)_2N$, triethylamine tetrafluorborate ("TEABF$_4$"), tributylamine tetrafluorborate ("TBABF$_4$"), $NaBF_4$, $NaPF_6$, trimethylsulfonylchloride, and $(NH_4)_2SO_4$. When the supporting electrolyte is used instead of a typical sulfuric acid, an electrolytic solution may be prepared by using a non-aqueous solvent.

As a charge carrier passing through the ion exchange membrane, $Li^+$, $Na^+$, $Cl^-$, $Br^-$, $I^-$, $SO_4^-$, $BF_4^-$, $PF_6^-$, $ClO_4^-$, $CF_3SO_3^-$, or bis(trifluoro-methylsulfonyl)imide $((CF_3SO_2)_2N^-)$; or TFSI may be used.

In addition to typical mobile phones or portable computers, the redox flow battery according to embodiments is suitable for use in an application requiring high capacity and high power output, such as an electric vehicle. In addition, the redox flow battery may be combined with a typical internal combustion engine, a fuel battery, or a super capacitor for use in a hybrid vehicle. In addition, the redox flow battery may also be used in other high-power output and high voltage applications.

Hereinafter, embodiments are described in detail with reference to Examples and Comparative Examples, but the embodiments are not limited thereto.

PREPARATION EXAMPLE 1

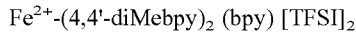
Fe$^{2+}$-(4,4'-diMebpy)$_2$ (bpy) [TFSI]$_2$ 0.994 g (5 mmol) of $FeCl_2.4H_2O$ was added to a 100 ml round bottom flask, 50 ml of methanol was added thereto, and the mixture was stirred for 30 minutes until a solution was obtained.

0.78 g (5 mmol) of bipyridine was added to a 100 ml round bottom flask, 10 ml of methanol was added thereto, and the mixture was stirred for 10 minutes until a solution was obtained.

The bipyridine solution was slowly added to the $FeCl_2.4H_2O$ solution, and the resultant solution was stirred at room temperature for 2 hours until the mixed solution gradually turned red. 10 ml of a methanol solution of 1.842 g (10 mmol) of 4,4'-dimethylbipyridine was added thereto, and refluxing was performed thereon at a temperature of 50° C. overnight. 7.56 g (12 mmol) of LiTFSI dissolved in $H_2O$ was added to the resulting mixture, and after 12 hours of stirring, the product was filtered and purified by recrystallization to obtain 5.5 g (a yield of 96.4%) of a red solid.

PREPARATION EXAMPLE 2

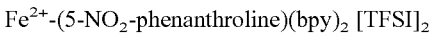
Fe$^{2+}$-(5-NO$_2$-phenanthroline)(bpy)$_2$ [TFSI]$_2$ 0.994 g (5 mmol) of $FeCl_2.4H_2O$ was added to a 100 ml round bottom flask, 50 ml of $H_2O$ was added thereto, and the mixture was stirred for 30 minutes until a solution was obtained.

1.0126 g (5 mmol) of 5-nitrophenanthroline was added to the 100 ml round bottom flask and the mixture was stirred for 150 minutes until a solution was obtained.

30 ml of an acetonitrile solution of 1.5618 g (10 mmol) of bipyridine was added thereto, and then, refluxing was performed thereon at a temperature of 50° C. overnight. Then, 10 ml of an aqueous solution of 7.56 g (12 mmol) of LiTFSI was added thereto, the resulting mixture was stirred, precipitated, and then filtered to obtain 5.5 g (a yield of 95.3%) of a scarlet solid.

PREPARATION EXAMPLE 3

Fe$^{2+}$-(terpy)(4'-chloro-terpy) [TFSI]$_2$ 0.994 g (5 mmol) of $FeCl_2.4H_2O$ was added to a 100 ml round bottom flask, 70 ml of $H_2O$:MeCN=5:2 was added thereto, and the mixture was stirred for 30 minutes until a solution was obtained.

1.338 g (5 mmol) of 4'-chloroterpyridine was added to the 100 ml round bottom flask, and then, the result was stirred for 60 minutes at a temperature of 40° C. until a solution was obtained. Then, 1.166 g (5 mmol) of terpyridyl was added thereto, and refluxing was performed thereon at a temperature of 40° C. for 12 hours. 10 ml of an aqueous solution of 7.56 g (12 mmol) of LiTFSI was added thereto, and the resulting mixture was stirred at a temperature of 40° C. for 2 hours, precipitated, purified, and re-crystalized to obtain 5.5 g (a yield of 98.4%) of a violet solid.

PREPARATION EXAMPLE 4

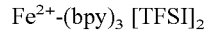
Fe$^{2+}$-(bpy)$_3$ [TFSI]$_2$ 15.24 g (29.88 mmol) of Fe(TFSI)$_2$.6H$_2$O was added to a 100 ml round bottom flask, 50 ml ethanol was added thereto, and the mixture was stirred for 20 minutes until a solution was obtained.

14 g (89.64 mmol) of bipyridine was added to a 100 ml round bottom flask, 80 ml of ethanol was added thereto, and the mixture was stirred for 10 minutes until a solution was obtained.

The bipyridine solution was slowly added to the Fe(TFSI)$_2$.6H$_2$O solution and the resulting mixture was stirred at room temperature for 3 hours until the mixed solution gradually turned red. The product was filtered, washed three times with 150 ml of water and ethanol, dried in the air, and then in a vacuum oven to obtain 16.632 g (a yield of 79.7%) of a dark red solid.

PREPARATION EXAMPLE 5

Fe$^{2+}$-(4,4'-diMe-bpy)$_3$ [TFSI]$_2$ 3.62 g (5 mmol) of Fe(TFSI)$_2$.6H$_2$O was added to a 100 ml round bottom flask, 50 ml of ethanol was added thereto and the mixture was stirred for 20 minutes until a solution was obtained.

1.338 g (5 mmol) of 4,4'-dimethylbipyridine was added to a 100 ml round bottom flask, 80 ml of ethanol was added thereto, and the mixture was stirred for 10 minutes until a solution was obtained.

The 4,4'-dimethylbipyridine solution was slowly added to the $Fe(FSI)_2 \cdot 6H_2O$ solution and the resulting mixture was stirred at room temperature for 6 hours until the mixed solution turned dark red. The product was filtered, washed three times with 150 ml of water and ethanol, dried in the air, and then in a vacuum oven to obtain 5.7 g (a yield of 97.5%) of a red solid.

PREPARATION EXAMPLE 6

$Fe^{2+}$-($NO_2$-phenanthroline)$_3$ [TFSI]$_2$ 3.62 g (5 mmol) of $Fe(TFSI)_2 \cdot 6H_2O$ was added to a 100 ml round bottom flask, 50 ml of ethanol was added thereto, and the resulting mixture was stirred for 20 minutes until a solution was obtained.

3.38 g (15 mmol) of nitro phenanthroline was added to a 100 ml round bottom flask, 70 ml of ethanol was added thereto, and the mixture was stirred for 30 minutes until a solution was obtained.

The nitro phenanthroline solution was slowly added to the Fe $(TFSI)_2 \cdot 6H_2O$ solution and the resulting mixture was stirred at room temperature for 12 hours until the mixed solution gradually turned red. The product was filtered, washed three times with 150 ml of water and ethanol, dried in the air, and then in a vacuum oven to obtain 6.35 g (a yield of 98.31%) of a red solid.

PREPARATION EXAMPLE 7

$Fe^{2+}$-(terpy)$_2$ [TFSI]$_2$ 3.62 g (5 mmol) of Fe $(TFSI)_2 \cdot 6H_2O$ was added to a 100 ml round bottom flask, 50 ml of ethanol was added thereto, and the result was stirred for 20 minutes until a solution was obtained.

2.33 g (10 mmol) of terpyridine was added to a 100 ml round bottom flask, 80 ml of ethanol was added thereto, and the result was stirred for 10 minutes until a solution was obtained.

The terpyridine solution was slowly added to the $Fe(TFSI)_2 \cdot 6H_2O$ solution, and the result was stirred at room temperature for 12 hours until the mixed solution gradually turned violet. After the product was filtered, the filtrate was washed three times with 150 ml of water and ethanol, dried in the air, and then in a vacuum oven to obtain 5.3 g (a yield of 98%) of a violet solid.

PREPARATION EXAMPLE 8

$Fe^{2+}$-(4'-chloro-terpy)$_2$ [TFSI]$_2$ 3.62 g (5 mmol) of $Fe(TFSI)_2 \cdot 6H_2O$ was added to a 100 ml round bottom flask, 50 ml of ethanol was added thereto, and the mixture was stirred for 20 minutes until a solution was obtained.

2.68 g (10 mmol) of 4'-chloroterpyridine was added to a 100 ml round bottom flask, 80 ml of ethanol was added thereto, and the mixture was stirred for 10 minutes until a solution was obtained.

The 4'-chloroterpyridine solution was slowly added to the Fe $TFSI_2 \cdot 6H_2O$ solution, and the resulting mixture was stirred at room temperature for 12 hours until the mixed solution gradually turned violet. The product was filtered and the filtrate was washed three times with 150 ml of water and ethanol, dried in the air, and then in a vacuum oven to obtain 5.6 g (a yield of 97.3%) of a violet solid.

Cyclic Voltammetry

A current with respect to a potential of the electrolytes prepared according to Preparation Examples 1 to 3 during 20 cycles was measured at a scan rate of 100 millivolts per second ("mV/s"), and at a potential scan range of 0 V to 1.0 V in the case of $Fe^{2+}$-(4,4'-diMebpy)$_2$(bpy) [TFSI]$_2$, 0 V to 1.5 V in the case of $Fe^{2+}$-(5-$NO_2$-phenanthroline)(bpy)$_2$ [TFSI]$_2$, and 0 V to 1.0 V in the case of $Fe^{2+}$-(terpy)(4'-chloro-terpy) [TFSI]$_2$. For the purpose of measurement of cyclic voltammetry, a cell that includes an $Ag/Ag^+$ electrode prepared by dissolving 0.3 M $AgNO_3$ in an acetonitrile solvent as a reference electrode, a carbon felt as a working electrode, and platinum as a counter electrode was used.

Figure 2A:
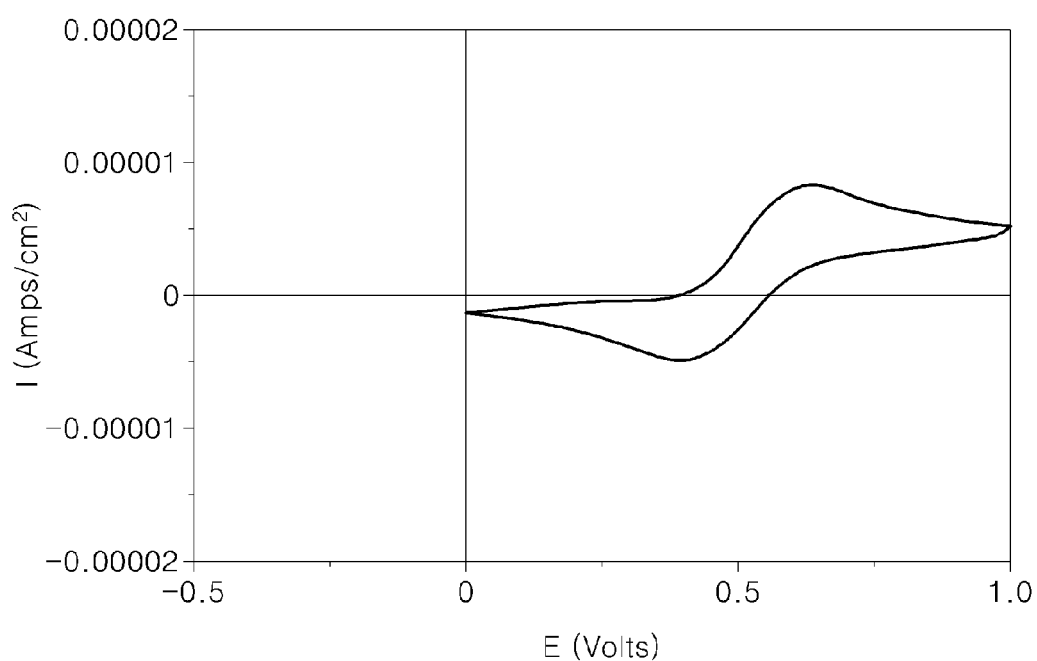
FIGS. 2A-2C are graphs of current density (amperes per square centimeter, Amps/cm$^2$) versus electric potential (volts, V) which are cyclic voltammetry graphs of an organic electrolytic solution including electrolytes prepared according to Preparation Examples 1 to 3.
Figure 2B:
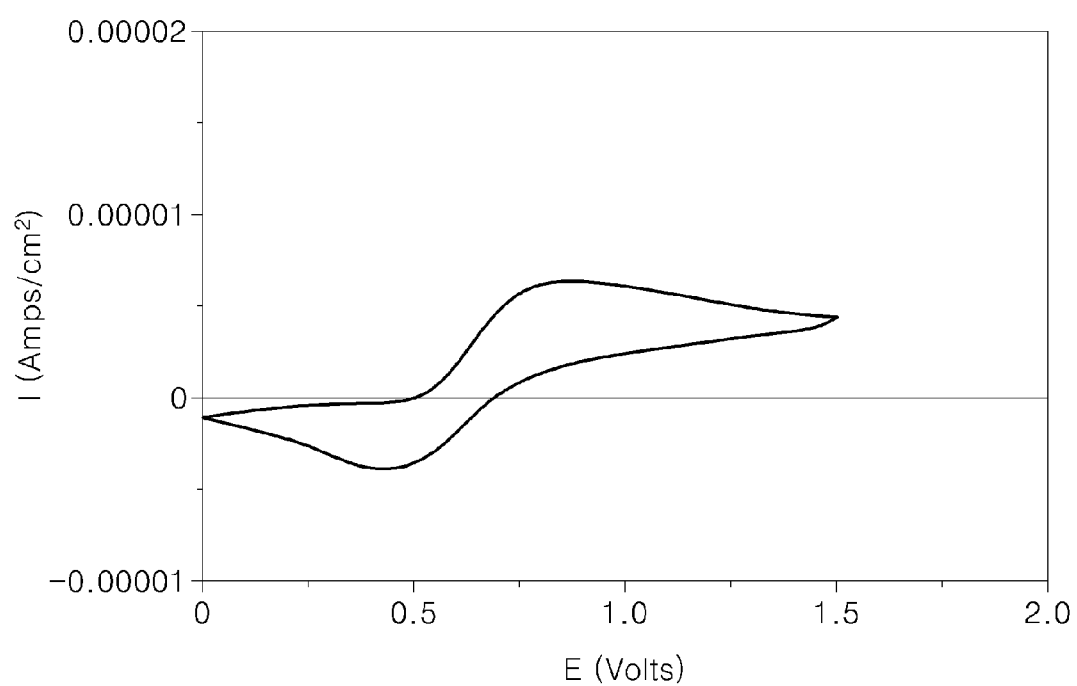
Figure 2C:
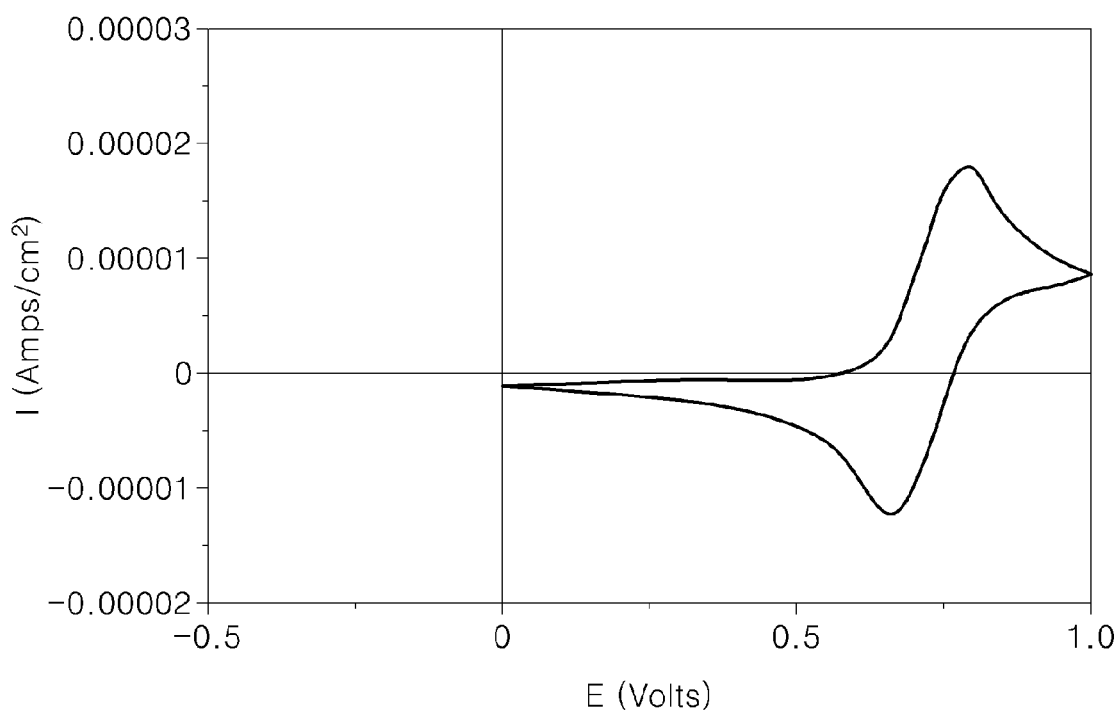

Test results are shown in FIG. 2. FIGS. 2A, 2B, and 2C respectively show results of Preparation Example 1 to Preparation Example 3.

Referring to FIGS. 2A to 2C, the graphs of an electrolyte including a metal-ligand coordination compound show a reversible oxidation/reduction peak.

Solubility Measurement

Solubility of the metal-ligand coordination compounds prepared according to Preparation Examples 1 to 8 in a non-aqueous polar solvent was measured as below.

Amounts of the respective solutes (the metal-ligand coordination compounds prepared according to Preparation Examples 1 to 8) that were dissolvable in 50 mL of a solvent of acetonitrile and propylene carbonate at a ratio of 1:1 were measured. A density of the solution was measured and calculated in a molar concentration.

Results of the solubility are shown in Table 1 below.

TABLE 1

| | $E^0$ | Solubility |
|---|---|---|
| Preparation Example 1 | 0.56 | 1.09 |
| Preparation Example 2 | 0.72 | 1.15 |
| Preparation Example 3 | 0.72 | 1.33 |
| Preparation Example 4 | 0.68 | 1.05 |
| Preparation Example 5 | 0.43 | 0.65 |
| Preparation Example 6 | 0.88 | 1.02 |
| Preparation Example 7 | 0.70 | 1.20 |
| Preparation Example 8 | 0.78 | 0.75 |

As shown in Table 1, it was confirmed that the compounds prepared according to of Preparation Example 1, Preparation Example 2, and Preparation Example 3, that is, a metal-ligand coordination compound including two or more different ligands and having a dipole moment sum greater than 0, respectively had higher solubility than the compounds of Preparation Example 4 and Preparation Example 5, the compounds of Preparation Example 4 and Preparation Example 6, and the compounds of Preparation Example 7 and Preparation Example 8, that is, a metal-ligand coordination compound that includes identical ligands and of which a dipole moment sum is 0.

EXAMPLE 1

A catholyte was prepared by dissolving 0.2 M [Fe(terpy)(4'-chloro-terpy)(TFSI)$_2$] in 5 ml of acetonitrile, an anolyte was prepared by dissolving 0.2 M [Co(bpy)$_3$(TFSI)$_2$] in 5 ml of acetonitrile, and then, charging was performed thereon. Each of the catholyte and anolyte included as a supporting electrolyte, a 1.0 M TEABF$_4$ salt dissolved in acetonitrile.

Carbon felt (Nippon Graphite, GF20-3, t=3 mm, A=5×5 cm$^2$) was heat treated in an air atmosphere at a temperature of 500° C. for 5 hours to manufacture an electrode, and as a cell, a non-flow type cell manufactured as described below was evaluated. A Na conductive nafion membrane (Product name: Nafion 117, manufacturer: Dupont) was used as an ion exchange membrane.

An insulator, a current collector, and a bipolar plate were stacked on a nut-integrated end plate. A 5×5 cm$^2$ square carbon felt electrode was cut in half to obtain two rectangles, and then, inserted into a concave of the bipolar plate.

3 ml of the catholyte and the anolyte were injected into the cathode carbon felt electrode and the anode carbon felt electrode prepared as described above and then assembling was performed thereon. Bolts with disk springs inserted thereto were fastened by using a torque wrench up to 1.5 Newton×meters ("Nm") in a diagonal sequence. After the assembling was completed, the remaining electrolytic solution was poured through pores of the respective electrodes, and then, the pores were clogged with Teflon bolts. The Teflon bolt having a gas leak hole was used for each bipolar plate.

COMPARATIVE EXAMPLE 1

1 M V$^{2+}$ and V$^{5+}$ solutions were prepared from aqueous solutions having 1M VOSO$_4$ (Aldrich, 97% hydrate) and 2M H$_2$SO$_4$ (Aldrich, 96% solution) and were used as a catholyte and an anolyte. As an electrode, a carbon felt (Nippon Graphite, GF20-3, t=3 mm, and A=5×5 cm$^2$) was used, and as an ion exchange membrane, Nafion 117 substituted with hydrogen ions was used. The method and sequence for all the vanadium battery assembling were the same as in the battery assembly method and sequence of Example 1.

COMPARATIVE EXAMPLE 2

A redox flow battery was manufactured in the same manner as in Example 1, except that Fe(bpy)$_3$ TFSI was used instead of Fe(terpy) (4'-chloro-terpy)(TFSI)$_2$].

Charging and discharging evaluation (non-flow type battery)

Charging and discharging tests were performed on the batteries manufactured as above at room temperature at a temperature of 25° c.

Charging and discharging conditions are as follows: according to a composition, charging was performed with a constant current of 5 to 10 milliamperes ("mA") until a voltage reached to 2.6 to 2.8 V, and discharging was performed with a constant current of 5 to 10 mA until a voltage reached to a voltage of 1.8 V.

Such charging and discharging test results are shown in Table 2.

TABLE 2

| | | | Efficiency % | |
|---|---|---|---|---|
| | System | OCV, V | Charging and discharging | Energy |
| Comparative Example 1 | All VRB | 1.36 | 22.7 | 22.4 |
| Comparative Example 2 | Fe$^{2+}$(terpy)$_2$/Co$^{2+}$(bpy)$_3$ | 2.10 | 85.3 | 80.8 |

TABLE 2-continued

| | | | Efficiency % | |
|---|---|---|---|---|
| | System | OCV, V | Charging and discharging | Energy |
| Example 1 | Fe$^{2+}$(4'-chloro-terpy)(terpy)/Co$^{2+}$(bpy)$_3$ | 2.12 | 83.8 | 77.9 |

Charging and discharging efficiency is a percentage point of a charge amount for discharging divided by a charge amount for charging, and energy efficiency is a product of voltage efficiency and charging and discharging efficiency.

A redox flow battery according to an embodiment has high energy density and excellent charge and discharge efficiency due to the inclusion of, as an electrolyte, a metal-ligand coordination compound with high solubility in a non-aqueous solvent.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A redox flow battery comprising:
   a cathode cell comprising
      a cathode and
      a catholyte solution;
   an anode cell comprising
      an anode and
      an anolyte solution; and
   an ion exchange membrane disposed between the cathode cell and the anode cell,
   wherein the catholyte solution and the anolyte solution each comprises a non-aqueous electrolyte,
   wherein the non-aqueous electrolytes of both the anolyte solution and the catholyte solution in combination comprises a plurality of metal-ligand coordination compounds, and
   wherein at least one of the metal-ligand coordination compounds comprises two or more different ligands,
   wherein a dipole moment of the metal-ligand coordination compound is greater than 0, and
   wherein the metal-ligand coordination compound comprises a nitrogen atom-containing heteroaromatic ligand, a nitrogen atom-containing heteroaliphatic ligand, or a combination thereof, wherein the nitrogen atom-containing heteroaromatic ligand or the nitrogen atom-containing heteroaliphatic ligand comprises at least one selected from a substituted or unsubstituted dipyridyl, a substituted or unsubstituted terpyridyl, a substituted or unsubstituted phenanthroline, a substituted or unsubstituted ethylenediamine, and a substituted or unsubstituted propylenediamine, and wherein each of the substituted dipyridyl, the substituted terpyridyl, the substituted phenanthroline, the substituted ethylenediamine, and the substituted propylenediamine comprises at least one group selected from a C1 to C6 alkyl group, a halogen atom, a C5 to C8 alkylphenyl group, and a nitro group.

2. The redox flow battery of claim 1, wherein the metal-ligand coordination compound comprises at least one metal selected from nickel, cobalt, iron, ruthenium, zinc, manganese, yttrium, zirconium, titanium, chromium, magnesium, cerium, copper, lead, and vanadium.

3. The redox flow battery of claim 1, wherein the metal-ligand coordination compound is one of the following compounds:

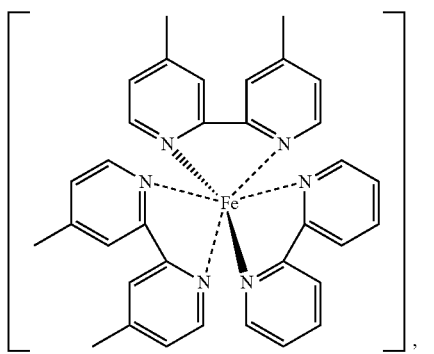

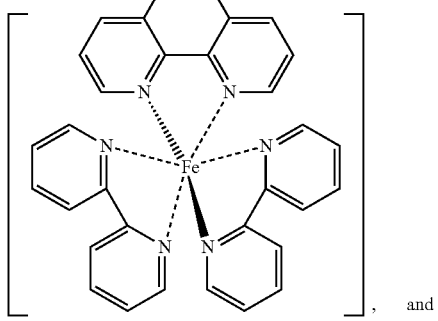
, and

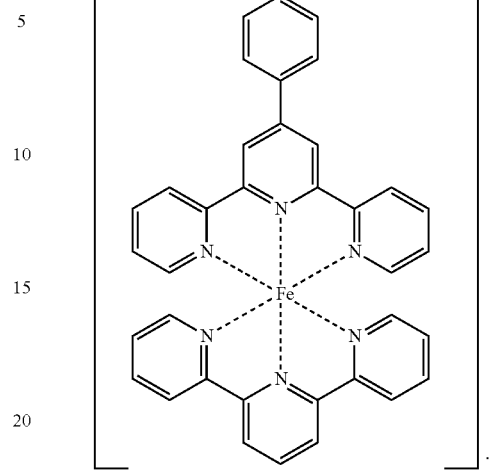
.

4. The redox flow battery of claim 1, wherein the metal-ligand coordination compound undergoes a reversible oxidation and reduction reaction.

5. The redox flow battery of claim 1, wherein the ion exchange membrane is an anion exchange membrane.

6. The redox flow battery of claim 1, further comprising a catholyte tank and an anolyte tank, wherein the catholyte tank and the anolyte tank respectively is each in fluid communicated with the cathode cell and the anode cell.

* * * * *